United States Patent [19]

Orlandini

[11] 4,114,398
[45] Sep. 19, 1978

[54] PROCESS FOR PRODUCING ARTICLES OF JEWELRY, TRINKETRY AND THE LIKE, MADE OF METALS OF DIFFERENT COLORS

[75] Inventor: Orlando Paladino Orlandini, Arezzo, Italy

[73] Assignee: Gori & Zucchi S.p.A., Italy

[21] Appl. No.: 767,617

[22] Filed: Feb. 10, 1977

[30] Foreign Application Priority Data

May 31, 1976 [IT] Italy ............................... 49729 A/76

[51] Int. Cl.² .......................... A44C 5/00; B23P 13/00
[52] U.S. Cl. ........................................ 63/3; 29/160.6;
29/DIG. 11; 29/DIG. 26; 63/4; 63/15;
228/156; 228/159; 228/173 E; 428/615
[58] Field of Search ...... 29/160.6, DIG. 11, DIG. 25,
29/DIG. 26, DIG. 48; 228/141, 155, 156, 159,
160, 162, 164, 173; 63/3, 4, 2, 15; 428/615, 635,
544

[56] References Cited

U.S. PATENT DOCUMENTS 921,722  5/1909  Meyer .................. 29/160.6

Primary Examiner—Victor A. DiPalma
Attorney, Agent, or Firm—Staas and Halsey

[57] ABSTRACT

A process for producing articles of jewelry, trinketry and the like, such as rings, necklaces, bracelets and the like starting from a composite tubular element made of different elements, characterized by the fact that it comprises the following steps of:

drawing a plurality of hollow tubular elements, each made of a metal of a different color or color tonality and each having an outer diameter slightly less than the inner diameter of another of said elements, while the element of the smallest outer diameter has a solid cross section;

inserting said tubular elements into each other in order to obtain a multi-layer composite tubular element having adjacent layers of different colors or color tonalities;

drawing said composite multi-layer element until the various adjacent tubular components perfectly adhere to each other;

cutting sections of the desired lengths from the composite elements obtained in preceding the step;

shaping each length of said composite element according to the desired configuration, optionally welding the ends of each length when an annular piece or the like has to be obtained; and cutting or milling each length of the composite element in those portions thereof where the outer surface or surfaces must show bands of different forms and colors in order to attain the desired decorative effect.

25 Claims, 3 Drawing Figures

PROCESS FOR PRODUCING ARTICLES OF JEWELRY, TRINKETRY AND THE LIKE, MADE OF METALS OF DIFFERENT COLORS

BACKGROUND AND SUMMARY OF THE INVENTION

The present invention relates to a process for producing articles of jewelry, trinketry and the like, as, for instance, bracelets, chains, necklaces, nick-nacks and the like, starting from a composite tubular element formed by a plurality of tubular elements of different diameters inserted one into the other and then cut according to planes suitably oriented or to surfaces of any shape.

The invention also concerns the articles and the semimanufactured products which are obtained by means of this process and which can be used to compose necklace elements, pendants and the like.

The process of this invention comprises the following steps of:
(a) drawing a plurality of hollow tubular elements, each made of a metal of a different colour and/or colour tonalities and each having an outer diameter slightly less than the inner diameter of another of said elements, while the smallest element preferably has a solid cross section;
(b) inserting said tubular elements into each other in order to obtain a multi-layer composite tubular element having layers of different colours and/or colour tonalities;
(c) drawing said composite multi-layer element until the various tubular components adhere perfectly to each other;
(d) cutting sections of the desired length from said composite element, obtained as in the step (c);
(e) shaping each length of said composite element according to the desired configuration, and optionally welding its ends in the case wherein an annular piece or the like has to be obtained;
(f) cutting or milling each length of the composite tubular element in those portions thereof where the outer surface has to show bands of different forms and colours in order to attain the desired decorative effect.

This process can be completed by conventional polishing operations or other superficial treatment.

BRIEF DESCRIPTION OF THE DRAWINGS

The accompanying drawing shows, merely by way of indicative example and without limiting the invention, an embodiment, according to which an annular bracelet is obtained having a prismatic side surface. In the drawing.

DESCRIPTION OF THE PREFERRED EMBODIMENT

In the shown embodiment the composite cylindrical element, generally indicated 1, is constituted of four tubular elements $a, b, c$ and which $d$, which are inserted into each other and are made of different gold alloys, in particular red gold, white gold, green gold and yellow gold.

Figure 1:
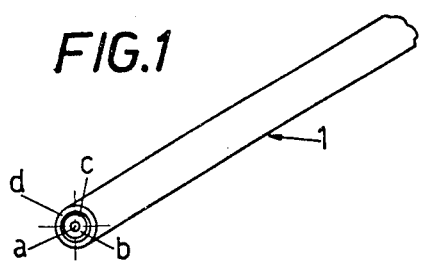
FIG. 1 is a perspective view of a cylindrical composite element formed of four coaxial cylindrical elements made of metals of different types.
Figure 2:
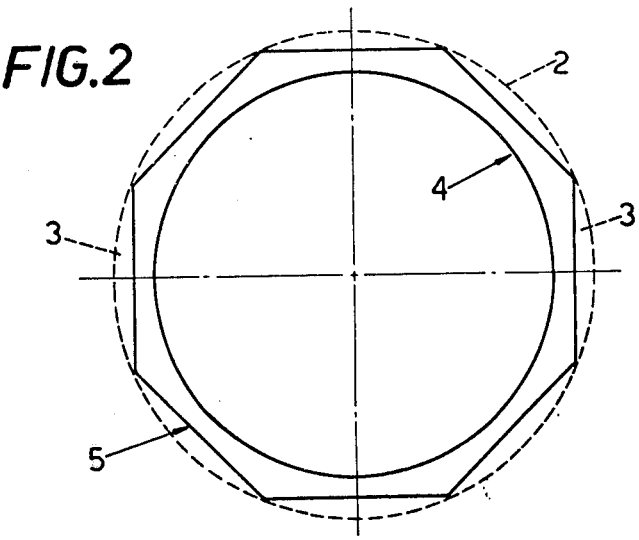
FIG. 2 is a top view of a bracelet produced from a length of the composite element, shown in FIG. 1.
Figure 3:
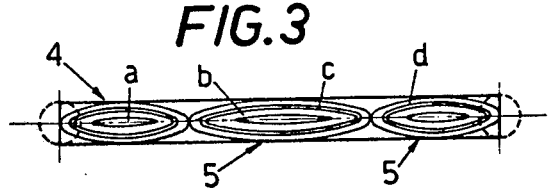
FIG. 3 is a side view of the bracelet shown in FIG. 2.

The composite cylindrical element 1 is obtained, drawing each of the tubular components $a, b, c$ and $d$, which have such diameter as to be able to be inserted into each other with a very small slack. The elements $a, b, c$ and $d$, after their mutual insertion, are subjected to a drawing step so that their coaxial cylindrical layers $a, b, c$ and $d$ can adhere to each other in the composite element 1 from which is cut any desired length. In this embodiment said length is then shaped so as to form an annular body, generally indicated 2, the ends of which are welded one to the other in a furnace. Any welding marks may be removed from the joining area by conventional means. The annular element 2, which has been so obtained and which is shown with a dotted line in FIG. 2, will be then subjected to milling operations in order to remove peripheral portions 3 so as to obtain flat surfaces 5, for instance, on the side zones of the article 4. The pattern and colours of the various layers $a, b, c$ and $d$, as can be seen in FIG. 3.

It will be apparent that the tubular composite element 1 can be of a cylindrical form, as in the shown embodiment, but it could be also have a cross section of any other shape, as for instance, a polygonal shape, in particular a triangular shape, or a rectangular shape, an elliptical shape, or any other either regular or irregular configuration.

We claim:
1. A method of making jewelry from a plurality of elongated metallic elements having progressively smaller cross-sections, at least each of said elements other than the one having the smallest cross-section being hollow and having an interior opening sufficiently large to accommodate the element having the next-smaller cross-section, which comprises the steps of: inserting said elements one inside the other to form a composite elongated element; drawing said composite elongated element; cutting said composite elongated element into sections; shaping said sections into jewelry configuration; and removing material from portions of said composite elongated element to expose at least one interior elongated element.

2. An article of jewelry produced in accordance with claim 1.

3. A pendant produced in accordance wih claim 1.

4. The method of claim 1, wherein said sections are shaped into annular configurations, further comprising the step of joining the ends of said sections.

5. The method of claim 4, wherein said ends are joined by welding.

6. An article of jewelry produced in accordance with claim 5.

7. The method of claim 4; wherein the step of removing portions of said composite elongated element is performed by cutting said composite elongated element to present at least one flat surface.

8. An article of jewelry produced in accordance with claim 7.

9. A ring produced in accordance wih claim 7.

10. A bracelet produced in accordance with claim 7.

11. A necklace produced in accordance with claim 7.

12. A chain produced in accordance with claim 7.

13. A method of making multi-layered jewelry stock from a plurality of elongated metallic elements having progressively smaller cross-sections, at least each of said elements other than the one having the smallest cross-section being hollow and having an interior opening sufficiently large to accommodate the element having the next-smaller cross-section, which comprises the steps of: inserting said elements one inside the other to form a composite elongated element; and drawing said composite elongated element.

14. Multi-layered jewelry stock produced in accordance with the method of claim 13.

15. A process for producing articles of jewelry, trinketry and the like, as rings, necklaces, bracelets and the like starting from a composite tubular element made of different metallic elements, comprising the steps of:
   drawing a plurality of hollow tubular elements, each made of a metal of a different colour or colour tonality and wherein each of said tubular metal elements has an outer diameter slightly less than the inner diameter of another of said elements, while the element of the smallest outer diameter has a solid cross section;
   inserting said tubular elements into each other in order to obtain a multi-layer composite tubular element having adjacent layers of different colours or colour tonalities;
   drawing said composite multi-layer element until the various adjacent tubular components perfectly adhere to each other;
   cutting said composite element into sections;
   shaping each of said sections into jewelry configuration; and
   cutting or milling each of said sections in those portions thereof where the outer surface or surfaces must show bands of different forms and colours in order to attain a decorative effect.

16. A process according to claim 15, further comprising the step of welding together the ends of said sections.

17. A process according to claim 15, wherein the employed metals are noble metals and/or alloys thereof.

18. A process according to claim 15, wherein the cross section of the tubular elements designed to compose the composite element is circular, polygonal, eliptical and the like.

19. A process according to claim 15, wherein the composite element is cut so as to present flat side surfaces.

20. An article of jewelry obtained by the process according to claim 15.

21. A necklace obtained by the process according to claim 15.

22. A chain obtained by the process according to claim 15.

23. A ring obtained by the process according to claim 15.

24. A pendant obtained by the process according to claim 15.

25. An unfinished product obtained by the process according to claim 15.

* * * * *